April 10, 1951        M. J. LEWIS        2,548,540
METER AND METER SOCKET

Filed May 6, 1949        4 Sheets-Sheet 1

INVENTOR
Morgan J. Lewis
BY
ATTORNEYS

April 10, 1951 M. J. LEWIS 2,548,540
METER AND METER SOCKET
Filed May 6, 1949 4 Sheets-Sheet 2

INVENTOR
Morgan J. Lewis
BY
ATTORNEYS

April 10, 1951      M. J. LEWIS      2,548,540
METER AND METER SOCKET

Filed May 6, 1949      4 Sheets-Sheet 3

INVENTOR
Morgan J. Lewis
BY
ATTORNEYS

April 10, 1951 M. J. LEWIS 2,548,540
METER AND METER SOCKET
Filed May 6, 1949 4 Sheets-Sheet 4
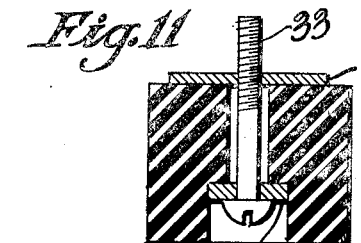
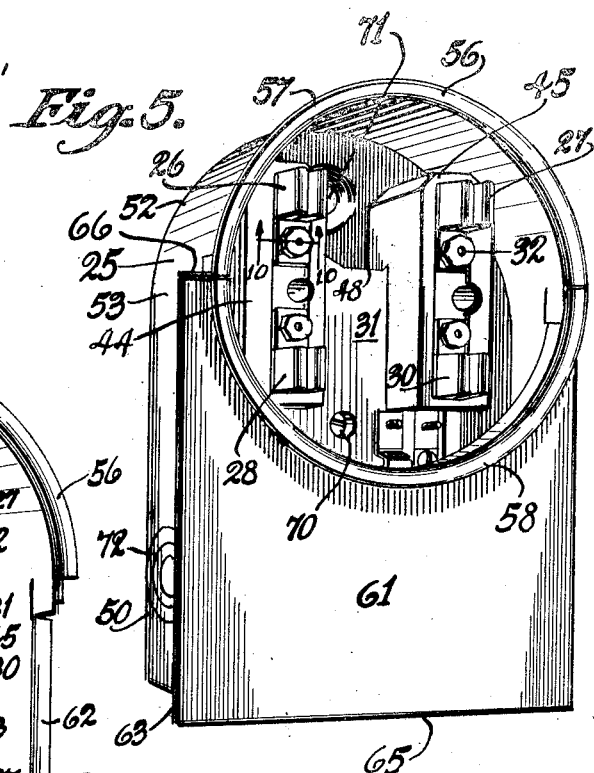
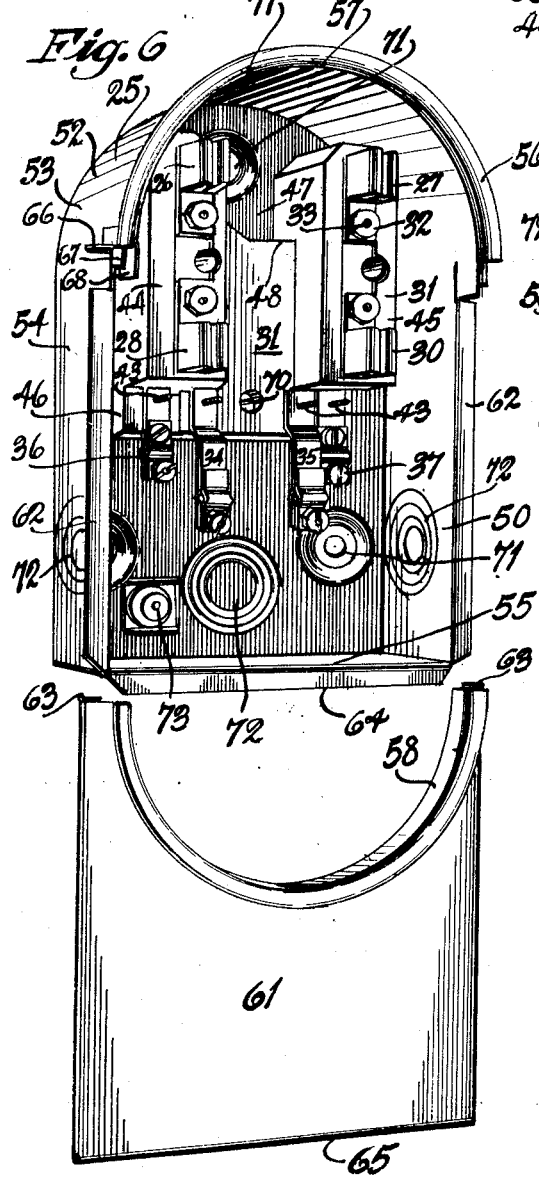
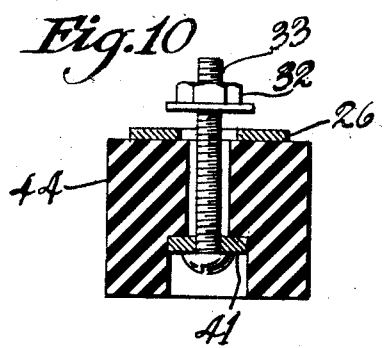
INVENTOR
Morgan J. Lewis
BY
ATTORNEYS Patented Apr. 10, 1951

2,548,540

UNITED STATES PATENT OFFICE 2,548,540

METER AND METER SOCKET

Morgan J. Lewis, Philadelphia, Pa.

Application May 6, 1949, Serial No. 91,686

9 Claims. (Cl. 175—224)

The present invention relates to electric watthour meters and the like and to sockets and troughs for mounting the same.

A purpose of the invention is to facilitate testing of a watthour meter without disconnecting the electric current from the user.

A further purpose is to render the terminals of a watthour meter socket more readily accessible for inspection and testing, while at the same time minimizing the danger of tampering with the equipment.

A further purpose is to avoid difficulty through entry of water into the socket of a watthour meter.

A further purpose is to provide a slidable cover on a watthour meter trough, which cover carries a removable segment of the socket ring.

Further purposes appear in the specification and in the claims.

The present application is concerned with subject matter related to that of copending applications Serial No. 108,681, filed August 5, 1949, for Meter Troughs and Boxes; and Serial No. 108,682, filed August 5, 1949, for Electric Instrument Socket.

In the drawings I have chosen to illustrate a few only of the numerous embodiments in which my invention may appear, selecting the forms shown from the standpoints of convenience in illustration, satisfactory operation and clear demonstration of the principles involved.

Figure 5 is a view corresponding to Figure 1, with the meter and locking collar removed from the trough, and the cover in place.

Figure 6 is a detached perspective showing the cover removed from the trough of Figure 5.

Figure 9 is a bottom plan view of the insulation base of the socket.

Figure 10 is a section of Figure 5 on the line 10—10, showing one form of test nut.

Figure 11 is a view corresponding to Figure 10 showing a variation.

Figure 12 is a perspective of the locking collar.

Figure 1:
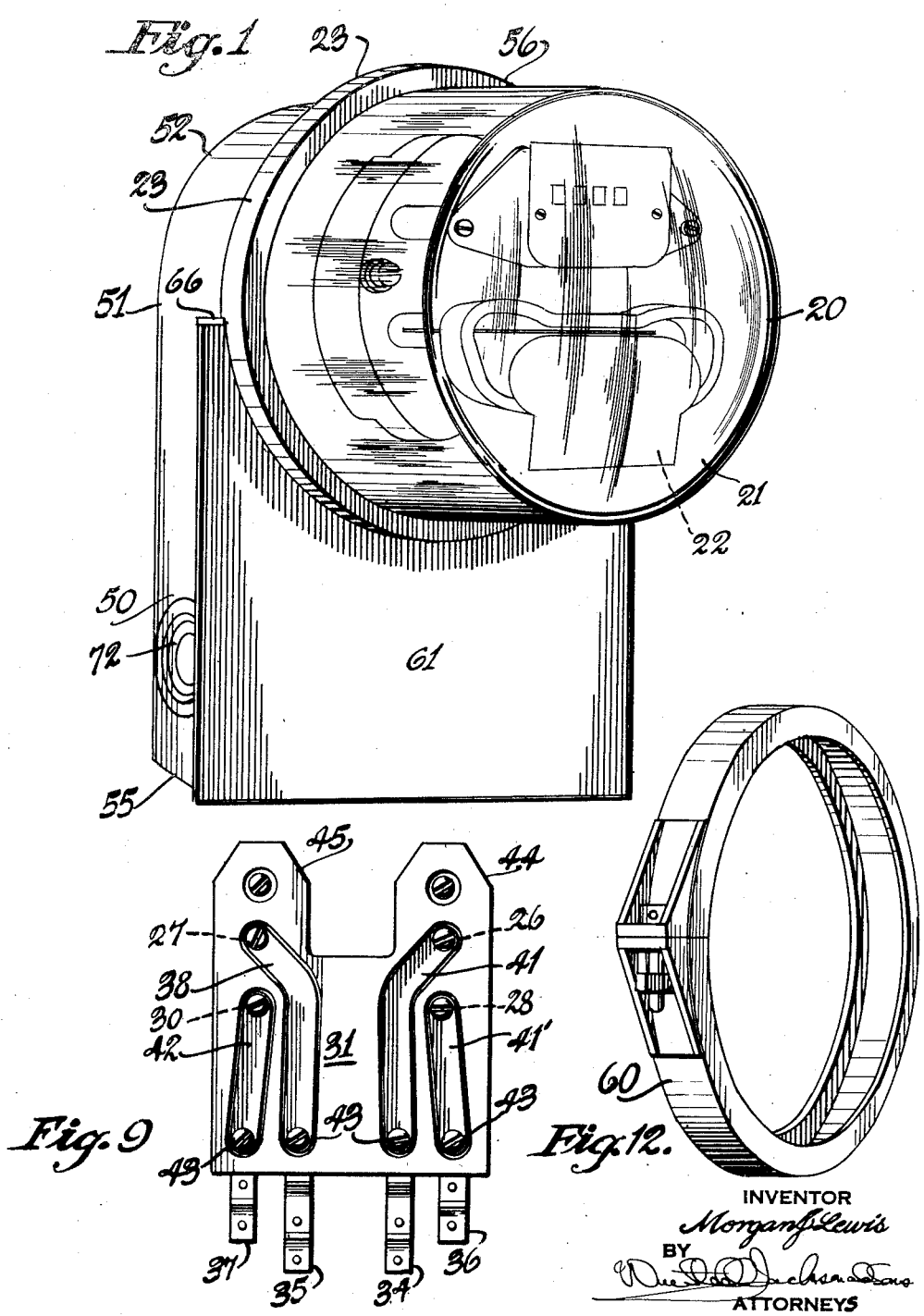
Figure 1 is a perspective of a watthour meter mounted on the improved socket and trough of the present invention.
Figure 2:
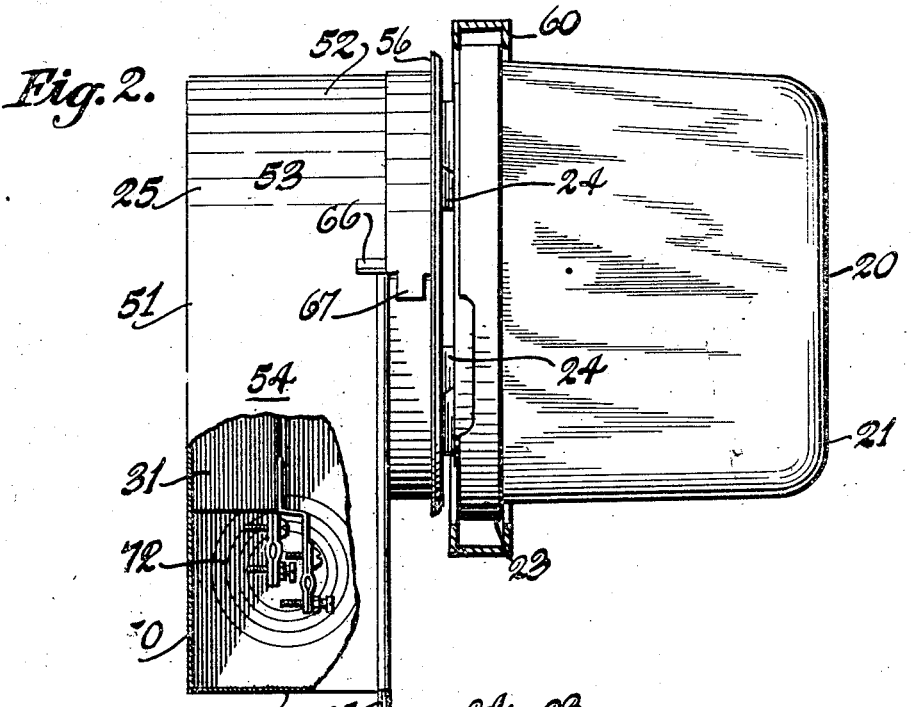
Figure 2 is a side elevation of Figure 1, partially broken away to show the socket terminals, and with the meter partially removed from the socket to show the switch blades, and with the locking collar in axial section.
Figure 3:
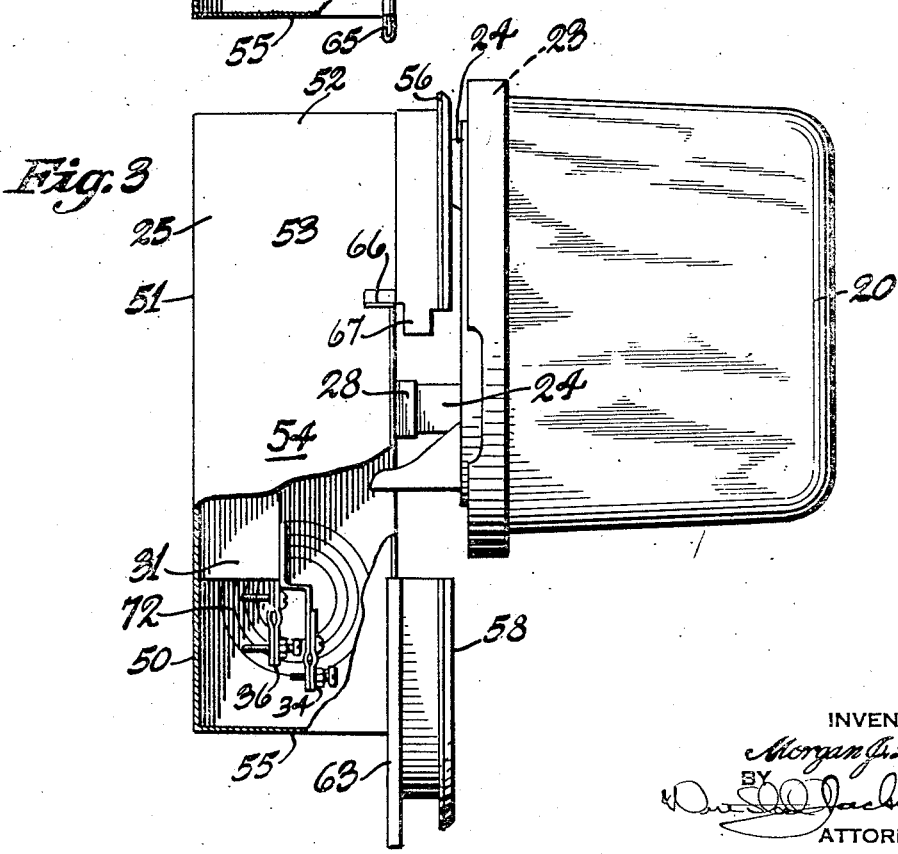
Figure 3 is a side elevation corresponding to Figure 2, showing the removable segment of the socket ring and cover partially withdrawn, and omitting the locking collar.
Figure 4:
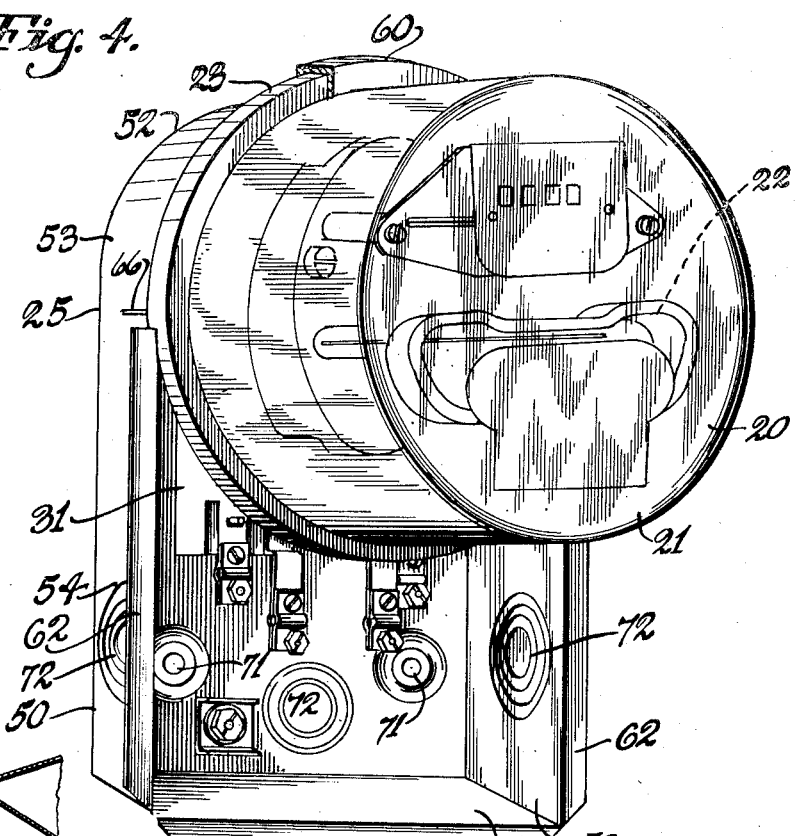
Figure 4 is a perspective from the front showing the cover and removable segment of the socket ring completely removed, with the locking collar partially broken away.

Describing in illustration but not in limitation and referring to the drawings:

In the conventional electric watthour meter sockets at present on the market, the socket carries a group of jaw contacts which make contact with switch blades on the meter itself. The meter has a meter ring which mates with a socket ring on the socket, and the two are locked together by a locking collar, which is usually clamped and sealed closed by a suitable seal.

The jaw contacts normally have terminals directly adjacent the jaws, and the upper portion of the socket carries a knock-out or other suitable connection for the service and load busses.

A serious difficulty in this construction is that in making periodic inspections and tests, both to determine whether the meter is functioning properly and also to be sure that the device has not been tampered with, it is necessary to disconnect the current from the user. This is often troublesome or dangerous, as it may result in stopping electric appliances such as clocks, oil burners, or the like.

A further difficulty has been encountered in the use of the prior art electric meter and socket combinations. The wiring has often been led directly into the socket, usually at the top, so that condensation or rain water coming down the interior of any such conduit has been carried into the jaw contacts and is likely to cause electric failures or to soil or corrode the contacts.

In accordance with the present invention, the difficulties referred to have been overcome. It is possible by the invention to gain access to the socket terminals without removing the meter, so that service can be maintained for the user during a temporary removal of the meter for inspection or test. At the same time the socket remains very secure against tampering.

The possibility of entry of moisture into the electrical connections is largely avoided by the present invention, since the load and service bus connections are introduced into a box below the socket, where the quantity of moisture usually encountered can remain without doing harm until it drains away.

In accordance with the invention, the socket ring is provided with a removable segment, which is normally locked in closed position by the locking collar, but is interconnected with the cover and, when the locking collar is removed, permits removal of the cover.

As best seen in Figures 1, 2, 3 and 4, the watthour meter 20 may be of any suitable type, normally having a transparent bowl-like cover 21, operating mechanism 22, a base ring 23 and meter blades 24 in the base. The meter blades are suitably insulated from one another and from the socket which they enter. A trough 25 surrounds the socket. The blades engage in resilient contact line jaw contacts 26 and 27, respectively, and similar load jaw contacts 28 and 30, respectively, normally positioned at the corners of a rectangle as shown in Figures 5 and 6.

The respective jaw contacts are mounted on an insulating base 31, suitably of porcelain or phenolic resin. At the base each jaw contact makes contact through a test nut 32 (see Figure 10) with a bolt 33 extending to a recess in the back of the base, and there making contact with a connecting strip which extends to one of the socket terminals 34, 35, 36 and 37. The connecting strip 33 extends from line jaw contacts 26 to terminal 34 and connecting strip 41 connects line jaw contacts 27 with terminal 35. Likewise the connecting strip 41' connects load jaw contacts 28 with load terminal 36 and the connecting strip 42 connects load jaw contacts 30 with load terminal 37. The connections, of course, occur only when the test nuts are screwed down. The connection in each case extends from one of the connecting strips through one of the screws 43 to the terminal.

The base 31 is suitably of H formation, with upstanding arms 44 and 45 each mounting two of the jaw contacts, and a lower shelf-like extension 46 mounting the terminals as a group to one side of the socket. A recess 47 at the top extends about half way down between the portions 44 and 45, while a slot 48 continues along the line of the recess to the bottom of the base at approximately the depth of the shelf 46.

The trough 25 is integrally attached to a depending box 50 which surrounds the socket terminals. Thus the combined trough and box includes a rear wall 51 extending desirably flat from top to bottom and providing a rear limit to the trough and box, an arcuate top wall 52 on the trough, side walls 53 on the trough merging with parallel side walls 54 on the box, and a bottom wall 55 on the box.

In closed position of the parts, a socket ring 56 extends around the socket, consisting of a stationary portion 57 which is mounted rigidly with the top and side walls of the trough, and the removable portion 58 which in closed position cooperates with the relatively stationary portion 57 to form an annulus. The socket consists of an axially extending collar and an outer flange or rim. In closed position the socket ring 56 mates with the meter ring in the manner well known in the art, and receives a locking collar 60 (Figure 12) which surrounds the meter ring and the socket ring, and holds the two together as well known in the art, and is normally engaged at its meeting ends by a clamp and seal.

The removable segment 58 of the socket ring is suitably integrally connected with a cover 61 for the box, which is slidably interconnected with the box by a guideway. The guideway is formed by outer parallel flanges 62 on the side walls of the box at the front edges thereof which are engaged by U-bent portions 63 on the cover, extending around under the flanges.

To further provide a good seal and avoid the possibility of prying up of the cover, in closed position an interlock is provided at the bottom between an outer flange 64 on the front edge of the bottom of the box and an upturned U-bent portion 65 on the cover, similar in shape to the U-bent portion 63.

It will be understood that the portions of the side walls carrying the flanges 62 are desirably straight, parallel and directed toward the socket so that the segment 58 will move directly in toward the socket.

To prevent misplacement of parts in closed position, the end of the U-bent portion 63 on the cover strikes a stop 66 on the side wall 53 when the segmental portion 58 moves into closed position.

Figure 7:
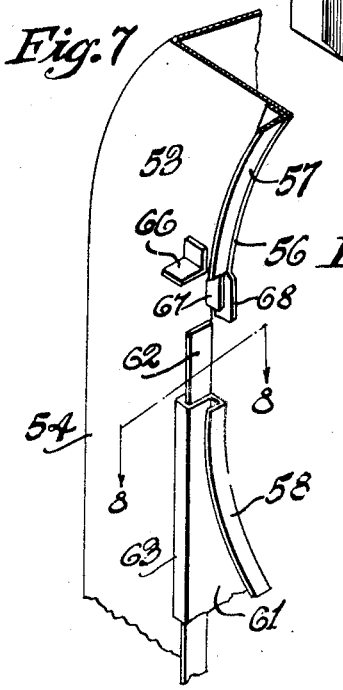
Figure 7 is a fragmentary enlarged perspective of the socket ring and its removable segment, the segment being partially removed.
Figure 8:
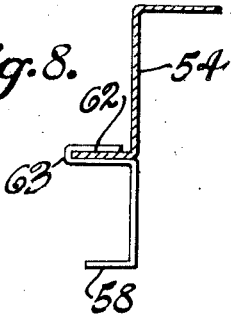
Figure 8 is a section of Figure 7 on the line 8—8.

To guide the stationary and removable portions of the socket ring when they come together and prevent misalignment, spaced prongs 67 and 68 are provided preferably on the stationary segment of the socket ring to extend one outside and one inside the removable portion when the two segments come together as best seen in Figure 7. The prong 67 may desirably be formed from an angle portion making up the stationary segment of the locking ring, while the prong 68 may desirably be formed from the metal of the side wall which is suitably joined as by spot welding to the angle portion as seen in Figure 7.

It will be evident that the exact selection of the length of each segmental portion will vary with the particular design, although preferably each segmental portion will be about 180° as shown.

The insulating block 31 is secured to the box by bolts 70. Suitable insulation may be employed at the back of the block to protect against contact with the back of the box and trough. Holes 71 are provided for mounting the box on a suitable support such as a wall by screws or bolts. Connections for conduit or other suitable busses from the line and to the load are provided at the bottom of the box below the terminals through knock-outs 72 in the back and sides of the box. A ground connection is provided at 73.

In some installations the test nuts of Figures 5, 6 and 10 may be unnecessary. In that case the jaw contacts (as 26') will be directly connected to the screws 33 as shown in Figure 11.

It will be evident that the device is well suited to use on an outdoor meter, and can also be used inside a house or other installation.

In operation it will be understood that when it is desired to inspect or test the meter or connections, the locking collar around the meter ring and socket ring is first removed, by breaking the seal and opening the clamp. The removable segment and cover are then slid down on the guideways. Jumpers across the meter can then be inserted, for example by attaching clips to each line terminal and the corresponding load terminal. The customer is now assured service notwithstanding that the meter may be disconnected.

The operator then removes the meter. He can proceed in one of several ways. The test nuts can be loosened to disconnect the jaw contacts from the line and load. A test jack can be inserted in the jaw contacts, as well known in the art, and the meter can be inserted in the test jack, after which a phantom load can be applied to test the meter while the customer continues to get unmetered service temporarily through the jumpers. During this test the socket acts merely as a support for the meter.

If desired the test nuts can be opened when service is to be temporarily disconnected. To restore normal service it is merely necessary to close the test nuts, restore the meter, remove any jumpers and restore the cover, removable segment and locking collar.

Thus it will be evident that the meter can be removed bodily without disconnecting the service providing jumpers are applied, and access for the purpose of applying jumpers can be readily attained. At the same time the integrity of the connections at the socket terminals can readily be inspected.

The terminals are conveniently located to one side of the socket clips, and preferably below the same, and it will be evident that moisture introduced by the conduits to the line or load will not readily come in contact with the terminals or jaws.

It will be evident that it is decidedly preferable in the present invention to bring the line and load into the box below the socket terminals to avoid the possibility of intrusion of moisture. However, if under specialized circumstances it is necessary to accomplish the lead-in through the top, this can be done, in view of the recess 47 in the insulating base between the side columns which support the jaws of the socket. It is simply necessary to make an opening through the top 52 in line with this recess and bring in the conduit at that point.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. In a meter trough, a group of jaw contacts for contact with a meter, a group of terminals located to one side of the jaw contacts and individually connected to the jaw contacts, and an enclosure for the jaw contacts and terminals comprising a trough enclosing the jaw contacts and including a socket ring for attachment to the meter and having a segmental part of the socket ring separable from the rest of the socket ring, and a box around the terminals having a removable cover, the separable part of the socket ring being attached to the removable cover and the cover permitting access to the terminals while a meter has contact with the jaw contacts.

2. In a meter trough, a group of jaw contacts for contact with a meter, a group of terminals located below the jaw contacts and individually connected thereto, a trough surrounding the jaw contacts on the top, sides and back and having a socket ring on the front provided with a segmental part separable from the rest of the socket ring, and a box surrounding the terminals at the sides, bottom and back, having a removable cover at the front, the removable cover being attached to the separable segmental part of the socket ring and communicating interiorly with the socket at the bottom of the socket and the top of the box.

3. In a meter trough, a group of jaw contacts for contact with the meter, a group of terminals connected to the jaw contacts, and an enclosure for the jaw contacts and terminals comprising a trough enclosing the jaw contacts and including a socket ring for attachment to the meter having a segmental portion of the socket ring separable from the rest of the socket ring which is relatively movable with respect to the remainder of the socket ring and a housing around the terminals having a removable cover on which the relatively movable segmental portion of the socket ring is mounted.

4. In a meter trough, a group of jaw contacts for contact with the meter, a group of terminals located to one side of the jaw contacts and individually connected to the jaw contacts and an enclosure for the jaw contacts and terminals comprising a trough enclosing the jaw contacts and including a socket ring having a segmental portion separable from the rest of the socket ring, a box around the terminals, a removable cover for the box mounting the separable segmental portion of the socket ring and guideways slidably interconnecting the cover and the box.

5. In a meter trough, a group of jaw contacts, a group of terminals located below the jaw contacts and individually connected thereto, a trough surrounding the jaw contacts on the top, sides and back, and having a socket ring on the front provided with a removable segment, a box surrounding the terminals at the sides, bottom and back, a removable cover on the front interconnected with the removable segment of the socket ring and guideways interconnecting between the box and the cover, the cover and removable segment being slidable in the guideways toward and away from the socket ring.

6. In a meter and mounting combination, an electric meter having meter contact knives and a meter ring, a group of jaw contacts cooperating to receive the meter contact knives, socket terminals arranged as a group and electrically connected to the jaw contacts, a box and trough combination surrounding the switch jaws and socket terminals, having a socket ring which mates with the meter ring, a segmental portion of the socket ring being separable from the rest of the socket ring, and having a cover interconnected with the separable segmental portion of the socket ring and covering the socket terminals, and a collar surrounding and locking together the meter ring and the socket ring and holding the cover in closed position.

7. In a meter and mounting combination, a meter having meter contact knives and having a meter ring, a combined trough and box having a socket ring which mates with the meter ring and which includes a segmental portion removable from the rest of the socket ring, having walls which form an enclosure and having a cover slidably connected with the walls of the enclosure and carrying the removable segmental portion of the socket ring, jaw contacts within the trough making contact with the contact knives on the meter, a group of socket terminals individually connected with the switch knives and located beneath the cover, and a locking collar surrounding the meter ring and the socket ring and holding the cover in closed position.

8. In a meter mounting, a socket having a group of jaw contacts for contact with a meter, socket terminals displaced to one side with respect to the socket and individually electrically connected to the jaw contacts, a trough and box surrounding the socket and terminals, having an opening in front in the socket and also in front of the terminals and having at the forward edges of the box on either side in front of the terminals diverging parallel flanges, a socket ring surrounding the socket and divided into segments of substantially 180°, one of which is at the side of the socket remote from the box and the other of which is at the side of the socket toward the box, and a cover having cooperating guideways which interconnect with the flanges on the box and mounting the segmental portion of the socket ring which is toward the box.

9. In a meter mounting, a socket having a group of jaw contacts for contact with a meter, socket terminals displaced to one side with respect to the socket and individually electrically connected to the jaw contacts, a trough and box surrounding the socket and terminals, having an opening in front in the socket and also in front of the terminals and having at the forward edges of the box on either side in front of the terminals diverging parallel flanges, a socket ring surrounding the socket and divided into segments each of substantially 180° one of which is located at the side of the socket remote from the box and the other of which is located at the side of the socket toward the box, a cover having cooperating guideways which interconnect with the guideways on the box and mounting the segmental portion of the socket ring toward the box, and prongs extending from one segmental portion of the socket ring toward the other and guiding the segmental portions in their motion toward one another.

MORGAN J. LEWIS.

REFERENCES CITED

The following references are of record in the file of this patent:

UNITED STATES PATENTS

| Number | Name | Date |
| --- | --- | --- |
| Re. 21,929 | Rypinski | Oct. 21, 1941 |
| 1,739,142 | Hill et al. | Dec. 10, 1929 |
| 2,297,833 | Johansson | Oct. 6, 1942 |
| 2,329,349 | Johansson | Sept. 14, 1943 |